April 19, 1966  C. R. WILSON ETAL  3,246,752
TESTING ARRANGEMENT
Filed July 9, 1964
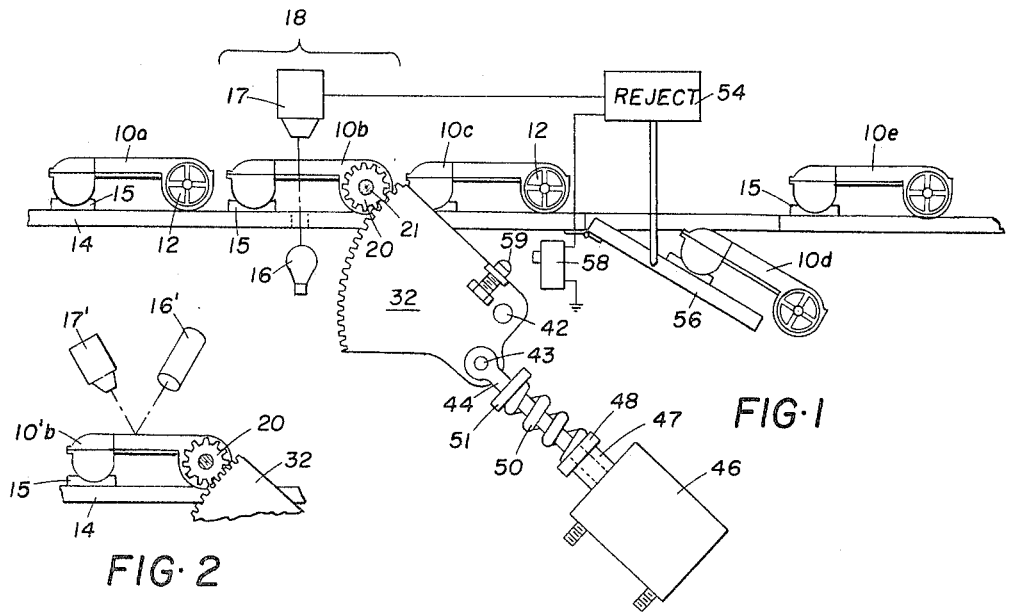
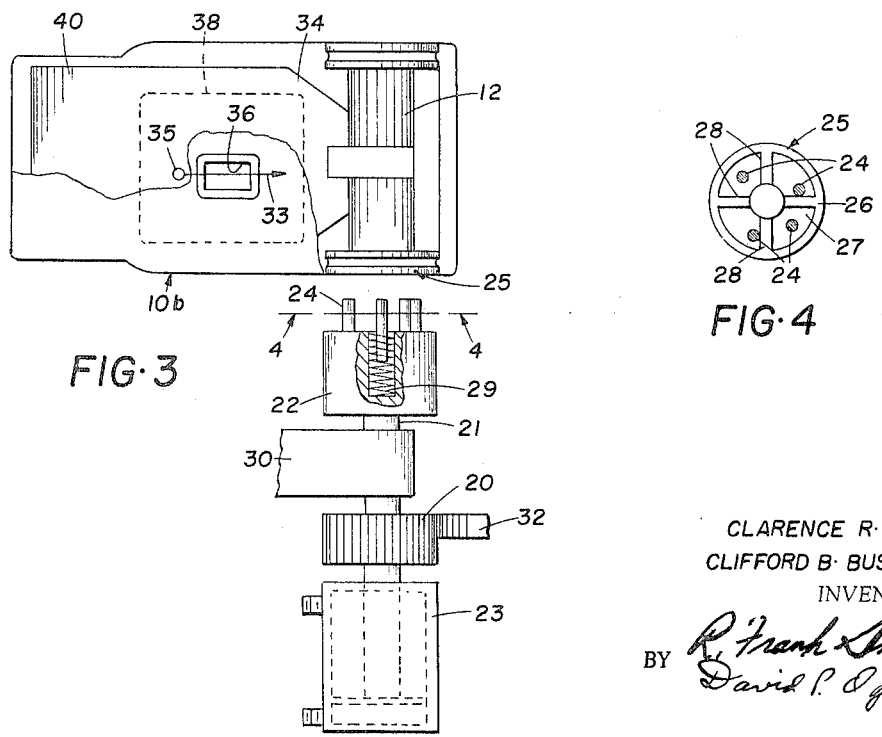
CLARENCE R. WILSON
CLIFFORD B. BUSHNELL
INVENTORS
BY *R. Frank Smith*
*David P. Ogden*
ATTORNEYS

United States Patent Office 3,246,752
Patented Apr. 19, 1966

3,246,752
TESTING ARRANGEMENT
Clarence R. Wilson and Clifford B. Bushnell, both of Rochester, N.Y., assignors to Eastman Kodak Company, Rochester, N.Y., a corporation of New Jersey
Filed July 9, 1964, Ser. No. 381,461
12 Claims. (Cl. 209—111.7)

This invention relates to a testing arrangement and, more particularly, to an arrangement for testing acceptable operation of a film scroll. This case is a continuation-in-part of our copending application Serial No. 270,690, filed April 4, 1963, now abandoned, by the inventors hereof and assigned to the assignee hereof.

In the art of manufacturing of various complex equipments, it is a usual practice to test the equipment to determine operability of certain portions thereof. However, in the art of film manufacture, many test steps may not be accomplished on all films produced because of the destructive results of usual film testing. On the other hand, in a film arrangement where the film is previously secured to a take-up spool, certain features of the operation of the scroll thus formed may be tested without destruction of the film.

Therefore, it is an object of our invention to provide a reliable film scroll testing arrangement.

In accordance with one embodiment of our invention, a cassette has placed therein a film scroll comprised of a non-spooled roll and a spaced-apart take-up spool. A leader strip of the backing paper of the film roll is secured to the spool and is provided with a coding or window suitable for detection as by transmitting radiant energy. Similarly, the cassette is provided with a front window suitable for framing an image on the film and a smaller back window suitable for viewing sequence numbers of the film backing paper. The coding in the leader is aligned so that it will pass under the smaller back window, whereby its passage thereby will initiate signal information. Testing is accomplished by applying a suitable force to rotate the take-up spool sufficiently to drive the backing paper coding past the smaller window of the cassette and provide a sequence of signals indicating a "good" test.

The subject matter which is regarded as our invention is particularly pointed out and distinctly claimed in the concluding portion of this specification. The invention, however, as to its organization and operation together with further objects and advantages thereof, will best be understood by reference to the following description taken in connection with the accompanying drawing in which:

FIG. 1 is a side plan view of the test equipment;
FIG. 2 is a side plan view of another embodiment;
FIG. 3 is a detail top plan view partially in section of a portion of the equipment shown in FIGS. 1 and 2; and
FIG. 4 is a detail view taken along the line 4—4 of FIG. 2.

Referring now to the drawing wherein like numbers refer to similar parts, we have shown a series of cassettes 10a, 10b, 10c, 10d, and 10e having therein a film and backing paper scroll attached to a take-up spool 12. The cassettes are conveyed along a table 14 preferably by means of a conveyor belt or chain having impellers 15 of a predetermined spacing arrangement so that each cassette 10 may stop in a precise location relative to an energy source such as a lamp 16, and a detection means such as a photocell detector 17 of a test station 18. If there is a problem of exposing film in the region of the test station 18, we prefer to use an infrared lamp 16, when using a photodetecting means 17.

Referring now to FIG. 2, we have shown a reflection type detection system wherein an energy source 16' directs energy toward the backing paper coding to provide reflective signal information to a detector 17'. Obviously, such a reflective detector could be placed under the cassette 10b as well as over it. Also a detector arrangement could use contact sensing as well as the radiant energy illustrated. Therefore, we do not wish to be limited unnecessarily to the particular sensing system disclosed herewith.

Referring now to FIG. 3, the spool drive arrangement is shown in some detail wherein a gear 20 is drivingly coupled to a shaft 21 which supports a driving head 22. The shaft 21 is longitudinally drivable by an operator shown as a pneumatic or hydraulic cylinder 23 in accordance with signal information provided indicating the location of a cassette 10b in the test station 18. This signal information is most easily provided by an indexing drive means (not shown) associated with the conveying of the cassettes 10. Thus, each time the cassettes stop, the cylinder 23 is activated. Protraction of the driving head 22 forces a plurality of pins 24 into the take-up spool drive region 25.

It should be noted, as shown more clearly in FIG. 4, that the take-up spool drive region 25 consists of an outer flange 26, a recessed portion 27, and a plurality of drive ridges 28. The drive ridges 28 serve to couple the film drive means of a camera to the spool 12. In accordance with the present invention, the pins 24 are arranged so that one of them will engage one of the drive ridges 28. The pins 24 are not symmetrical in the sense of being spaced equidistant around the periphery of the recess 27. Thus, one of the pins 24 will enter the recessed portion 27 adjacent to one of the drive ridges 28 to establish a driving working therewith with a small amount of rotation of the driving head 22. On the other hand, symmetrical location of the pins 24 would tend to result in an unknown amount of rotation (up to about 90°) of the driving head 22 prior to etsablishing a driving engagement. Another solution to this problem, previous orientation of the take-up spool 12, tends to be substantially more expensive than the use of the nonsymmetrical pins 24 as shown in FIG. 4.

Referring again to FIG. 3, it should be noted that each of the pins 24 is biased by a spring 29 toward the spool drive region 25 so that during protraction of the driving head 22, if one should engage one of the drive ridges 28, it will merely partially retract into the driving head 22 and compress the spring 29. In addition to being retractable, the shaft 21 is also rotatably journaled in a bearing 30 whereby a drive rack 32 may rotate the gear 20 and thus drive the head 22. Such rotation of the head 22 rotates the spool 12 to pull a portion of a leader 34 of a backing paper secured thereto an amount indicated by the arrow 33 so that a coding mark or window 35 therein passes under a back window 36 in the top of the cassette 10b. As mentioned above, the back window 36 is provided in the cassette so that exposure numbers on the rear surface of the backing paper may be viewed during operation of a camera using this cassette. Since there is also an image framing window 38 (in dashed lines) in the lower or housing portion of the cassette 10b, radiation such as light may pass through the paper window 35 when it is positioned under the small back window 36. Similarly reflected radiation as in FIG. 2 may be used to detect the coding 35. Such reflection may use either the back window 36 or the image framing window 38. At the same time, a portion of the backing paper in the roll 40 of the scroll is unwound. It should be noted that about one to one and one-half rotations of the spool 12 accomplishes motion sufficient to drive the paper coding 35 across the region of the small back window 36.

Referring again to FIG. 1, the rack 32 is, in fact, an arcuate drive member pivoted on a bearing 42 so that the force applied at a pin 43 by a shaft 44 will develop a driving force on the gear 20. The shaft 44 is driven indirectly by an operator shown as a pneumatic or hydraulic cylinder 46. The cylinder 46 directly drives a hollow shaft 47 having a flange 48 that engages resilient means such as a spring 50 to compress this spring 50 between the flange 48 and a flange 51 secured to the shaft 44. The stroke of the shaft 47 and the length of the compressible region of the spring 50 are selected so that the spring 50 will never be completely compressed to develop a direct driving connection between the shaft 47 and the pin 43. Thus, the force applied to the gear 20 can be no more than the compressible force developed by the spring 50 as a function of the effective radius of the rack 32 compared to the drive radius of the pin 43.

In the event that the spool 12, the leader 34 or the roll 40 is bound, glued, or otherwise prevented from moving in the cassette, no motion will result because of the attempted drive of the gear 20 by the spring 50. Such a condition indicates a "bad" test, whereby no signal is transmitted because of passage of the coding 35 and, of course, no signal is received by a reject operator 54. Such a condition will cause the operator 54 to energize a reject mechanism illustrated as a drop chute 56 when the particular "bad" cassette 10d reaches the location of the reject operator. Since several reject operating mechanisms are known in the quality control art, the details thereof need not be set forth herein, as any arrangement whereby the "bad" cassette is removed from the conveyor will suffice.

In the event that the gear 20 rotates freely or with an acceptable amount of driving force, completion of its rotation is indicated by actuation of a full test stroke switch 58 which is engaged by a contact 59 on the rack 32. If no other signals than the full stroke signal are received by the reject operator 54, the signal received from the switch 58 indicates a "bad" test of the type where the leader strip 54 is not secured to the spool 12 or the spool is broken.

The signal which indicates a "good" test starts with no signal from the photodetector 17 to the reject operator 54, a signal during the period the backing paper coding 35 is passing under the small back window 36, a termination of the signal from the photodetector 17 or the detector 17', and, finally, a signal from the full stroke switch 58. When such a predetermined signal sequence is received by the reject operator 54, the cassette developing such signal is allowed to pass through the reject station to packing or other handling equipments.

There are, of course, other malfunctions which are automatically detected by our invention. In the event that a continuous signal is received from the photodetector 17 or detector 17' from the start to the finish of the test stroke, this is an indication that the spool 12 is not moving the leader 34 or that an opaque portion of the leader 34 is not positioned under the window 36. Such a signal also indicates a "bad" test of the type where the scroll is missing or badly torn or the small back window 36 is enlarged by breakage of the cassette.

By way of example, the test operation is accomplished by first positioning a cassette (10b) in a preselected location in the test station 18; illuminating the backing paper 34 in the region of the window 36; activating the operator 23 to position the driving head 22 in a driving position with at least one of the pins 24 inserted in the drive region recess 27 to engage one of the drive ridges 28; activating the operator 46 to compress the spring 50; shortly thereafter, deactivating the operator 23; and, finally, deactivating the operator 46 and advancing the cassettes to place a next one in the test station. If the test is "good," the reject operator 54 receives a signal sequence "no signal," "signal," "no signal" from the photodetector 17 or the detector 17' and, finally, a "complete stroke" from the switch 58. If the signal received is other than this predetermined sequence, the reject operator 54 prepares to drop the bad cassette.

Thus, it is seen that we have provided a test arrangement for automatically determining whether the scroll is in the cassette, the paper and spool 12 are free to move in response to suitable drive force, the spool 12 is secured to the leader 34, the roll 40 is free to unwind in the cassette 10, and the paper coding 35 is in a predetermined location. Such test indicates that a cassette is usable by a camera and is accomplished without exposing any of the film within the roll 40. Therefore, this may be a test of all such filled cassettes produced.

While we have shown and described particular embodiments of the present invention, other modifications may occur to those skilled in this art. For instance, if the present invention is coupled directly to a cassette loading equipment, it may also provide an alarm when "bad" equipments are being produced. Also, detection of the coding mark 35 may take the form of ultrasonics or a feeler when a window or lump are used or may take the form of a magnetic detector if the coding 35 is magnetic material. We intend, therefore, to have the appended claims cover all modifications which fall within the true spirit and scope of our invention.

We claim:

1. Apparatus for testing a film and backing paper scroll within a cassette to determine that the scroll is drivable by a take-up spool thereof to move a coding of the backing paper past a window of the cassette, comprising:
   detection means responsive to the presence of the coding as it passes the cassette window for developing a first signal;
   a reject station receptive of the first signal;
   spool drive means for rotating the take-up spool to move the backing paper coding past the cassette window to initiate the first signal;
   switch means operable by said spool drive means to provide a second signal indicative of a complete stroke thereof, said reject station being receptive of the second signal in a predetermined sequence relative to the first signal; and
   means operable at said reject station when the first and second signals are not received in said predetermined sequence.

2. Apparatus for testing a film and backing paper scroll within a cassette to determine that the scroll is drivable by a take-up spool thereof to move the backing paper past a window of the cassette, comprising:
   detection means responsive to the motion of the backing paper in the region of the cassette window for developing a first signal;
   reject operator means receptive of the first signal;
   spool drive means for rotating the take-up spool to move a limited length of the backing paper past the cassette window to initiate the first signal;
   resilient means coupling said spool drive means to the take-up spool to determine a maximum force applied therebetween;
   switch means operable by said spool drive means to provide a second signal indicative of a complete stroke thereof, said reject operator being receptive of the second signal in a predetermined sequence relative to the first signal; and
   reject means operable by said rejector operator when the first and second signals are not received in said predetermined sequence.

3. Apparatus for testing a film and backing paper scroll within a cassette to determined that the scroll is drivable by a take-up spool thereof to move a window of the backing paper past a window of the cassette, comprising:
   a light source;
   a photodetector, receptive of light from said source that passes through the cassette window for developing a first signal;
   reject operator means receptive of the first signal;
   a driving head for rotating the take-up spool to move the backing paper window past the cassette window to initiate the first signal;

a linkage coupled to said driving head;

a drive spring in said linkage to limit the maximum force applied to the take-up spool;

switch means operable by said linkage to provide a second signal indicative of a complete stroke thereof, said reject operator being receptive of the second signal in a predetermined sequence relative to the first signal; and reject means operable by said reject operator when the first and second signals are not received in said predetermined sequence.

4. Apparatus for testing a film and backing paper scroll within a cassette to determine that the scroll is drivable by a take-up spool thereof to move a coding of the backing paper past the region of a window of the cassette, comprising:

a photodetector receptive of light directed toward the cassette window for developing a first signal;

reject operator means receptive of the first signal;

a driving head for rotating the take-up spool to move the backing paper coding past the cassette window to initiate the first signal;

a linkage coupling said driving head to an operator;

resilient coupling means in said linkage to limit the maximum force applied to the take-up spool;

switch means operable by said linkage to provide a second signal indicative of a complete stroke thereof, said reject operator being receptive of the second signal in a predetermined sequence relative to the first signal; and reject means operable by said reject operator when the first and second signals are not received in said predetermined sequence.

5. Apparatus for testing a film and backing paper scroll within a cassette to determined that the scroll is drivable by a take-up spool thereof to move a window of the backing paper past the region of a window of the cassette, comprising:

a photodetector receptive of light passing through the cassette window for developing a first signal;

reject operator means receptive of the first signal;

a driving head for rotating the take-up spool at least about one revolution to move the backing paper window past the cassette window to initiate the first signal;

a plurality of retractable driving pins in said driving head nonsymmetrically arranged so that only one of said pins will engage one of several symmetrically disposed drive ridges of the take-up spool;

a linkage coupling said driving head to an operator;

switch means operable by said linkage to provide a second signal indicative of a complete stroke thereof, said reject operator being receptive of the second signal in a predetermined sequence relative to the first signal; and reject means operable by said rejector operator when the first and second signals are not received in said predetermined sequence.

6. Apparatus for testing a film and backing paper scroll within a cassette to determine that the scroll is drivable by a take-up spool thereof to move a window of the backing paper past the region of a window of the cassette, comprising:

a photocell receptive of light passing through the cassette window for developing a first signal;

means for positioning one cassette to be tested adjacent to said photocell;

reject operator means receptive of the first signal;

a driving head for rotating the take-up spool in the one cassette to move the backing paper window past the cassette window to initiate the first signal;

first operator means for placing said driving head in a driving position relative to the take-up spool;

a plurality of retractable driving pins in said driving head nonsymmetrically arranged so that only one of said pins will engage one of several symmetrically disposed drive ridges of the take-up spool;

second operator means for rotating said driving head;

a linkage coupling said driving head to said second operator;

a drive spring in said linkage to limit the maximum rotational force applied to the take-up spool;

switch means operable by said linkage to provide a second signal indicative of a complete stroke of said driving head, said reject operator being receptive of the second signal in a predetermined sequence relative to the first signal; and reject means operable by said reject operator when the first and second signals are not received in said predetermined sequence.

7. Apparatus for testing a film and backing paper scroll within a cassette to determine that the scroll is drivable by a take-up spool thereof to move a coding of the backing paper past the region of a window of the cassette, comprising:

a detector responsive to passage of the coding past the cassette window for developing a first signal;

means for positioning one cassette to be tested adjacent to said detector;

a driving head for rotating the take-up spool in the one cassette to move the backing paper coding past the cassette window to initiate the first signal;

first operator means for placing said driving head in a driving position relative to the take-up spool;

a plurality of resiliently retractable driving pins in said driving head nonsymmetrically arranged so that only one of said pins will engage one of several symmetrically disposed drive ridges of the take-up spool;

second operator means for rotating said driving head;

switch means operable by said linkage to provide a second signal indicative of a complete stroke of said driving head in a predetermined sequence relative to the first signal; and reject means operable in accordance with the first and second signals being received other than in said predetermined sequence.

8. Apparatus for testing a film and backing paper scroll within a cassette to determine that the scroll is drivable by a take-up spool thereof to move a window of the backing paper past the region of a window of the cassette, comprising:

a photocell receptive of light passing through the cassette window for developing a first signal;

means for positioning one cassette to be tested adjacent to said photocell;

drive means developing a limited torque for rotating by a single stroke the take-up spool in the one cassette to move the backing paper window past the cassette window to initiate the first signal;

switch means operable by said drive means to provide a second signal indicative of a complete stroke in a predetermined sequence relative to the first signal; and reject means operable in accordance with the first and second signals being received other than in said predetermined sequence.

9. Apparatus for testing a film and backing paper scroll within a cassette to determine that the scroll is drivable by a take-up spool thereof to move a window of the backing paper past the region of a window of the cassette, comprising:

detection means receptive of light passing through the cassette window for developing a first signal;

transport means for positioning one cassette to be tested adjacent to said detection means;

drive means developing a limited torque for rotating by a single stroke the take-up spool in the one cassette to move the backing paper window past the cassette window to initiate the first signal;

switch means operable by said drive means to provide a second signal indicative of a complete stroke in a predetermined sequence relative to the first signal; and reject means operable in accordance with the first and second signals being received other than in said predetermined sequence.

10. A method for testing a film and backing paper scroll within a cassette to determine that the scroll is drivable by a take-up spool thereof to move a window of the backing paper past the region of a small back window of the cassette comprising the steps of:

illuminating the region of the small back window;

rotating the spool to drive the window of the backing paper past the back window;

developing a first signal in response to light transmission through the window of the backing paper;

developing a second signal in response to completion of the rotating step; and rejecting cassettes causing the development of signals not in a predetermined sequence.

11. A method for testing a film and backing paper scroll within a cassette to determine that the scroll is drivable by a take-up spool thereof to move a window of the backing paper past the region of a small back window of the cassete comprising the steps of:

placing the cassette in proximity with a light sensor;

illuminating the region of the small back window in a direction which will activate the sensor by passage of light therethrough;

rotating the spool with a limited torque to tend to drive the window of the backing paper past the back window for developing a first signal in response to light transmission through the window of the backing paper;

developing a second signal in response to completion of the rotating step; and rejecting cassettes causing the development of signals not in a predetermined sequence.

12. A method for testing a film and backing paper scroll within a cassette to determine that the scroll is drivable by a take-up spool thereof to move a coding on the backing paper past the region of a small back window of the cassette comprising the steps of:

placing the cassette in proximity with a light sensor;

illuminating the region of the small back window in a direction which will activate the sensor by passage of light therefrom to the coding and from the coding to the sensor;

applying limited torque to the spool to drive the coding of the backing paper past the back window when movable thereby for developing a first signal in response to light signal developed by the coding of the backing paper;

sensing completion of the driving step to develop a second signal; and rejecting cassettes causing the development of the first and second signals in other than a predetermined sequence.

No references cited.

ROBERT B. REEVES, *Primary Examiner.*